(12) United States Patent
Schmitt et al.

(10) Patent No.: US 7,060,930 B2
(45) Date of Patent: Jun. 13, 2006

(54) JOINING SYSTEM HEAD, JOINING SYSTEM, AND METHOD OF FEEDING AND JOINING ELEMENTS

(75) Inventors: Klaus G Schmitt, Giessen (DE); Michael Schneider, Lahnau (DE)

(73) Assignee: Newfrey LLC, Newark, DE (US)

( * ) Notice: Subject to any disclaimer, the term of this patent is extended or adjusted under 35 U.S.C. 154(b) by 132 days.

(21) Appl. No.: 10/436,882

(22) Filed: May 13, 2003

(65) Prior Publication Data
US 2004/0025331 A1 Feb. 12, 2004

(30) Foreign Application Priority Data
May 16, 2002 (DE) ................................ 102 23 147

(51) Int. Cl.
*B23K 9/20* (2006.01)
(52) U.S. Cl. .......................................... 219/98; 219/99
(58) Field of Classification Search .................... 219/8, 219/99, 98; B23K 9/20
See application file for complete search history.

(56) References Cited

U.S. PATENT DOCUMENTS

| | | | | |
|---|---|---|---|---|
| 4,620,079 A | * | 10/1986 | Allmann et al. | 219/98 |
| 4,792,655 A | * | 12/1988 | Ettinger | 219/98 |
| 6,388,224 B1 | * | 5/2002 | Torvinen | 219/99 |

* cited by examiner

*Primary Examiner*—Len Tran
(74) *Attorney, Agent, or Firm*—Harness, Dickey & Pierce, P.L.C.

(57) ABSTRACT

What is proposed is a joining system head (22; 170) for fixation to a movable frame (12), in particular to a robot (12), having
  holding means (66; 174) for an element (36) to be joined to a part (38), and
  joining drive means (64; 175) to move the holding means (66; 174)
  along a joining direction (40; 176) for joining.
The said holding means (66; 174) is mounted on the joining system head (22; 170), rotatable about an axis (34) running transverse to the joining direction (40; 176).

39 Claims, 7 Drawing Sheets

JOINING SYSTEM HEAD, JOINING SYSTEM, AND METHOD OF FEEDING AND JOINING ELEMENTS

BACKGROUND AND SUMMARY OF THE INVENTION

The present invention relates to a joining system head for attachment to a movable frame, in particular to a robot, having
- a holding means for an element to be joined to a part, and
- a joining drive means to move the holding means along a joining direction for joining.

The present invention relates further to a joining system having a robot movable on at least two coordinate axes and a joining system head attached to the robot. Lastly, the present invention relates to a method of feeding elements from a stationary unit to a movable joining system head and joining said elements to parts by means of the joining system head.

Such a joining system head, such a joining system and such a method of feeding and joining elements by means of a joining system head are generally known. The term 'joining' in the present context is intended to refer to all ways of connecting elements to parts, in particular connections of metal elements to metal parts, for example by bonding, forming, as for example riveting, or by union of matter, as for example welding, including short-time arc welding. Short-time arc welding is often referred to as bolt welding, even though it is not exclusively bolts that are welded. A current system of bolt welding in industrial use, in combination with a robot, is known in the brochure "Neue TUCKER Technologie. Bolzenschweißen mit System!," Emhart TUCKER, 9/99.

Bolt welding finds application chiefly, but not exclusively, in vehicular technology. Here, metal elements such as metal bolts, with or without threads, eyes, nuts etc., are welded onto the sheet metal of the bodywork. The metal elements then serve as anchors, or fastening elements, to fix for example interior fittings, lines and the like to the sheet metal of the body. At the joining system head, disclosed in the above-mentioned Emhart TUCKER publication, the joining drive means is configured either as a linear electric motor or as a combination of a lift magnet and a spring.

The holding means is constituted by a one-piece tongs elastically expandable in radial direction. The elements are as a rule welding bolts comprising a head having a somewhat larger diameter than the shank of the bolt. In the known system, the bolts are fed to the welding head by way of suitable feeding conduits by means of compressed air. The bolts are thus fed 'head first' into the tongs from behind. Ordinarily the bolt will strike the tongs from the inside, but without passing through it. A loading pin provided coaxial with the tongs is then actuated to propel the bolt thus fed through the tongs. The tongs are elastically expanded radially when the head of the bolt passes through. Then the tongs snap closed elastically around the shank of the bolt and hold it fast in the position determined by the travel of the pin.

The joining drive means in the form of a linear motor (or lift magnet/spring combination) has a travel of a few millimeters. Also, the welding head is fixed at the end of an arm of the robot, usually by way of a pneumatic or hydraulic carriage. That is, the entire welding head is movable in a direction parallel to the welding axis by means of the carriage, which has a considerably greater travel than the linear motor. The welding head further comprises a control means to control the linear motor and the loading pin, provided spatially separate from the welding head, more specifically in a stationary feeder.

To perform a welding operation, first the robot is programmed so that it travels into a predetermined position in which the carriage and linear motor axes are perpendicular to the sheet metal onto which the bolt is to be welded. The bolt is prestressed so that it protrudes vis-à-vis a supporting foot. Then the carriage is actuated until the foot meets the sheet metal. The bolt held in the holding means then rests in contact with the sheet metal. Next comes a determination of the zero line of the holding means with respect to the sheet metal. Alternatively, however, there are methods of zero line determination that dispense with the supporting foot.

Then, in the case of welding with supporting foot, an electric pre-current is switched on, passing through the bolt and the part. The bolt is then lifted relative to the part by means of the linear motor (lifting means). An electric arc is set up. Then a switch is made to the welding current. By the high welding current, the opposed faces of bolt and part begin to be fused. The bolt is then lowered onto the part again, so that the respective melts will mingle. Upon attainment of the part and the short circuit of the arc, or just before, the welding current is switched off. The entire melt solidifies and the welded connection is complete.

Now the welding head is drawn off from the welded-on bolt, using the carriage. The carriage is necessary because, among other reasons, the drawing-off motion must take place exactly on the centerline of the welded-on bolt. Otherwise, owing to the one-piece tongs, there would be danger of damage to the bolt and/or the tongs. The robot arm alone is not capable of such a precise linear motion in an arbitrary direction of space. For owing to the superposition of the simultaneous regulation of several components of robot arm motion, as required for this purpose, such linear motions can be executed by the robot with a certain amount of undulation only. The known welding head comprises a comparatively great axial extent. Since moreover the welding head must be drawn off from the bolt in axial direction, use of the welding head in places of difficult access is possible only within limits.

Then there are developments for employing robot technology to feed the bolt. Here a separate pick-up takes pre-sorted bolts and brings them to the welding location. This is disclosed in "Bolzenschweißen. Grundlagen und Anwendung" by Trillmich, Welz, Fachbuchreihe Schweißtechnik, DVS Verlag, 1997, Chapter 9.3. It is there explained that this technology lends itself especially to headed bolts that, because of their size and shape, cannot be blown through hoses. This type is referred to as the "pick-up system."

Further, a welding head by the firm of Nelson has been disclosed, in which a lift device moves a carrier projecting laterally arm-like up and down. At the terminal portion of the carrier, a holding means with tongs is rigidly mounted. The bolts are fed, as in the case of the TUCKER welding head described above, to the tongs from behind, by means of a compressed air hose extending through the carrier. The end portion of the carrier with holding device fixed thereto is more readily positioned at inaccessible locations. The lift device to move the projecting arm and the pertinent control means are arranged in the initial portion of the carrier.

Against this background, the object of the invention consists in specifying an improved joining system head, an improved joining system and an improved method of feeding and joining fed elements. This object is accomplished, in the case of the joining system head initially mentioned, in that the holding means is mounted rotatable at the joining system head about an axis extending transverse to the joining direction.

The joining system head according to the invention represents a completely novel concept. For joining, in particular for bolt welding, the joining operation of the prior art always takes place in a linear motion. In the prior art, consequently, it was the practice to mount the holding means slidable at least along a linear axis. For example, it is known that the joining system head may be mounted bodily on a carriage which in turn is fixed to the robot.

Owing to the rotatable mounting of the holding means on the joining system head, it is now possible to move the holding means along a circular or circular arc path. This creates the prerequisite for a number of fundamental changes in past concepts of joining system heads. The rotatability of the holding means is comparatively simple to realize as a matter of design. In particular, it is possible by means of the robot to turn the holding means on the circular path in order to reach various welding positions quickly and without extensive motion routines, for example a welding position for welding in vertical direction downward and then an overhead welding operation. The turnability as an additional degree of freedom at the joining system head is sufficient for many applications. Considering that also the carrier itself is rotatable about its longitudinal axis by means of the robot as a rule, and positionable at will in space, joining operations can be performed at very inaccessible locations indeed. The interference edge profile of the joining tool is here determined by the required radius of swing. In the joining system according to the invention, the above object is accomplished in that a joining system head according to the invention is attached to the robot.

The method according to the invention for feeding elements from a stationary unit to a movable joining system head and for joining said elements to parts by means of the joining system head, said joining system head comprising a holding means for an element, mounted rotatable about an axis extending transverse to the joining direction, includes the steps of feeding an element from the stationary unit to the transfer station at the joining system head, rotating the holding means towards the transfer station, taking over an element from the transfer station into the holding means, and joining the element taken over to the part. In the method of the invention, accordingly, there is a fundamental departure from the idea of feeding elements from the stationary unit directly to the holding means. Instead, the elements are fed to a transfer station at the joining system head, and the holding means is rotated towards the transfer station, to pick up the elements. The holding means thus 'fetches' the elements from the transfer station in each instance. As a result, there is an uncoupling between the feeding means comprised by the transfer station and the holding means. This is a prerequisite for a number of advantages about to be illustrated in detail. The object, then, has been wholly accomplished.

It is of especial advantage if the holding means and the joining drive means are mounted rotatable about the axis as a joining tool. In this embodiment, the holding means and the joining drive means form a rotatable unit of small dimensions. This is true especially if a control means to control the joining drive means is mounted at the welding head, but spatially separate from the joining tool. The joining tool can consequently be made with small dimensions and little relevant edge interference.

Here it is especially preferred if the joining tool is mounted rotatable about the axis at an end portion of a projecting elongated carrier. Owing to the arrangement of a joining tool of small dimensions at the end portion of an elongated carrier, it is possible to bring the joining tool to places difficult of access. Here no transmission of a lifting motion over long distances (no boom or the like) is required. Therefore the positioning and the actual joining or welding operation itself can be performed locally with high precision. At the same time, it is especially advantageous if the control means is provided in an initial portion of the carrier. The joining tool of small dimensions can then be brought to inaccessible locations through openings.

In an especially preferred embodiment, the elongated carrier comprises two arms running parallel, between which the joining tool is rotatably mounted. This embodiment has the advantage, firstly, that the mounting of the joining tool can be accomplished with high spatial precision. Besides, the space remaining between the arms of the carrier can be utilized for other functional units. These units as well as the joining tool are moreover protected between the arms of the carrier.

It is of especial advantage also if the axis of rotation is oriented transverse to the longitudinal axis of the carrier. In this embodiment, it is advantageously brought about that the circular path of the holding means can extend beyond the foremost ends of the carrier. Consequently, the carrier can be of comparatively short configuration. Secondly, it is brought about that the holding means can be swung as far as a midportion of the carrier, and can therefore be brought all the way to other functional units.

Over all, then, it is of advantage firstly if the joining system head comprises a feeding means with transfer station for the feeding of elements and if a loading drive means is designed to rotate the holding means and/or the joining tool all the way to the transfer station. Thus the elements are not fed, as in the prior art, all the way to the holding means. Rather, the feeding of the elements at first takes place only as far as the transfer station. Hence this step of the feed can take place while the joining-welding head itself is joining an already fed element to a part. This parallel processing serves to permit shorter periods over all. It is especially preferred if the transfer station is fixed to the carrier. Provided the transfer station is arranged on the elongated carrier, a fixed relative position of the transfer station can be achieved in relation to the holding means or the joining tool. Besides, it is advantageous that the cross section of the carrier is smaller as a rule than the cross section of the joining tool or the holding means, so that space is available for the transfer station.

According to one embodiment, the loading drive means comprises a rotary motor arranged at the end portion of the carrier. In this embodiment, a precise control of the joining tool can be achieved, with good response behavior.

In an alternative embodiment, the loading drive means comprises a rotary motor arranged in the initial portion of the holder and a gear to transmit the motions of the motor to the holding means. In this embodiment, an improved interference edge clearance results, since the interference-relevant end portion of the carrier has no motor of its own to move the holding means and/or the joining tool. Rather, the comparatively bulky motor is arranged in the initial portion of the carrier and transmits its motions to the holding means and/or the joining tool by way of a transmission. Also, a rotary motor will serve to execute motions with precision and high responsiveness.

It is especially preferred if the transmission is a transmission with tension means. The transmission with tension means will permit comparatively long distances between the initial portion of the carrier on the one hand and the final portion of the carrier on the other hand by comparatively simple design means.

In general, in a preferred embodiment, provision is made for the loading drive means and the joining drive means to consist of a single rotary drive means. In this embodiment, the rotatability of the holding means is used not only to swing the holding means all the way to a transfer station to 'fetch' an element. Rather, the holding means is moved to join a held element, not in a direction perpendicular to the axis of rotation, but along a circle around the axis of rotation. This embodiment has the special advantage that an axially prolonged linear drive in the region of the holding means, in particular the end region of the elongated carrier, is not required. Rather, the rotary drive means constituting the loading drive means and the joining drive means may be provided for example in the initial portion of the carrier, and their motions can be transmitted to the holding means in the end portion of the carrier by way of a transmission with tension means. In this embodiment, a sort of 'reduced' joining tool is formed at the anterior end portion of the carrier, consisting basically of the holding means alone. In this embodiment, consequently, an especially low interference edge relevance results, and hence the possibility of performing joining operations even in especially inaccessible locations.

In an alternative embodiment, the joining drive means comprises a linear drive means instead. In this embodiment, the holding means is consequently set in rectilinear motion for joining in conventional manner. The rotatability of the holding means about the axis of rotation is then preferably employed by means of development of the loading drive means to rotate the holding means or the joining tool into any welding position and/or 'fetch' elements from a transfer station of the feeding means.

Provided the linear drive means comprises a linear electric motor, only comparatively few lines are required for control. The holding means may then be regulated in either lift direction. In this embodiment, it is of especial advantage if the longitudinal axis of the joining drive means and the longitudinal axis of the holding means are spaced apart parallel to each other. Here it is possible to position the holding means so that even welding positions close to edges are attainable. The distance of the longitudinal axes may be within the range of a few centimeters, just enough to shift the holding means out of the joining drive direction projected into the joining direction.

In general, provision is made, in a preferred embodiment, for the holding means to comprise a plurality of jaws arranged distributed around the longitudinal axis of the holding means and movable away from each other so as to hold or release one element in each instance. It is especially preferred if the holding means comprises two jaws. The term 'jaws' is to be understood broadly in the present context. The jaws may for example refer to elongated fingers. With two jaws, rotationally symmetrical or approximately rotationally symmetrical parts in particular can be picked up conveniently and held securely. It is preferred for the jaws to be movable away from each other far enough so that the holding means can release the element by being drawn off from the element obliquely to the joining direction.

This embodiment makes it possible to accomplish the process of 'running' the joining system head away from the element joined to the part, by means of the robot alone. Then no carriage is required to establish a completely rectilinear reverse motion. Thus this embodiment also contributes to a small axial extent of the welding head.

However, it is especially preferred if the jaws are movable away from each other far enough so that the holding means can release the element by being swung away from the element about the axis of rotation. In this embodiment, the jaws can be moved far enough away from each other so that the joining tool need not be run away in the joining direction. Rather, it is possible to run the joining tool and/or the holding means away after the joining operation transversely, in particular perpendicular to the joining direction, the element passing between the jaws of the holding means. In this embodiment, therefore, no axial motion is required. In this way it is possible to pass the carrier with joining tool and/or holding means arranged at the anterior end portion through even extremely small means, and execute joining operations inside of cavities. The carrier, after the joining position has been reached, can remain positioned almost without change. After the joining operation, the joining tool is swung away transversely to the joining direction, and then the carrier can be run out of the cavity again along its longitudinal axis.

Also, this embodiment makes it possible for the elements to be picked up especially simply from the transfer station. The joining tool in this embodiment is swung in one step so that the holding means is oriented with an element at the transfer station with jaws released. Then the element can be grasped by the jaws and taken out of the transfer station by an ensuing swinging motion. In general, it is here preferred for a jaw actuator to be provided, actively opening and/or closing the jaws. In this embodiment, the jaws are usually configured as rigid fingers. The jaw actuator ensures that the jaws are either actively opened, to release an element, or else actively closed to hold the element.

Alternatively, it is possible for the jaws to be elastically configured or elastically mounted, in such manner that they are passively movable towards and/or away from each other. Here the jaws may either be made of an elastic material, in which case other elastic means may as a rule be dispensed with, or alternatively the jaws may be configured as rigid elements and elastically mounted. It is also possible within the scope of this embodiment for the jaws to be elastically pre-stressed in holding or in releasing direction. In that case, as a rule an actuator is provided that moves the jaws actively in the respective other direction.

In the joining system according to the invention, it is of advantage if a stationary individualizing means conveys individual elements to the feeding means of the joining-welding head. This embodiment serves generally to enhance the degree of automation. Such stationary individualizing and feeding means are known per se in the prior art. They convey individual elements in one step, however, all the way to the holding means, whereas in the joining system according to the invention, a conveyance occurs only as far as the feeding means (transfer station). Thence the holding means 'fetches' an element conveyed thither. It will be understood that the features named above and the features yet to be illustrated below may be employed not only in the combination given in each instance, but also in other combinations or by themselves, without departing from the scope of the present invention.

BRIEF DESCRIPTION OF THE DRAWINGS

Embodiments of the invention are represented in the drawing by way of example and will be illustrated in more detail in the description to follow. In the drawing.

DETAILED DESCRIPTION

Figure 1:
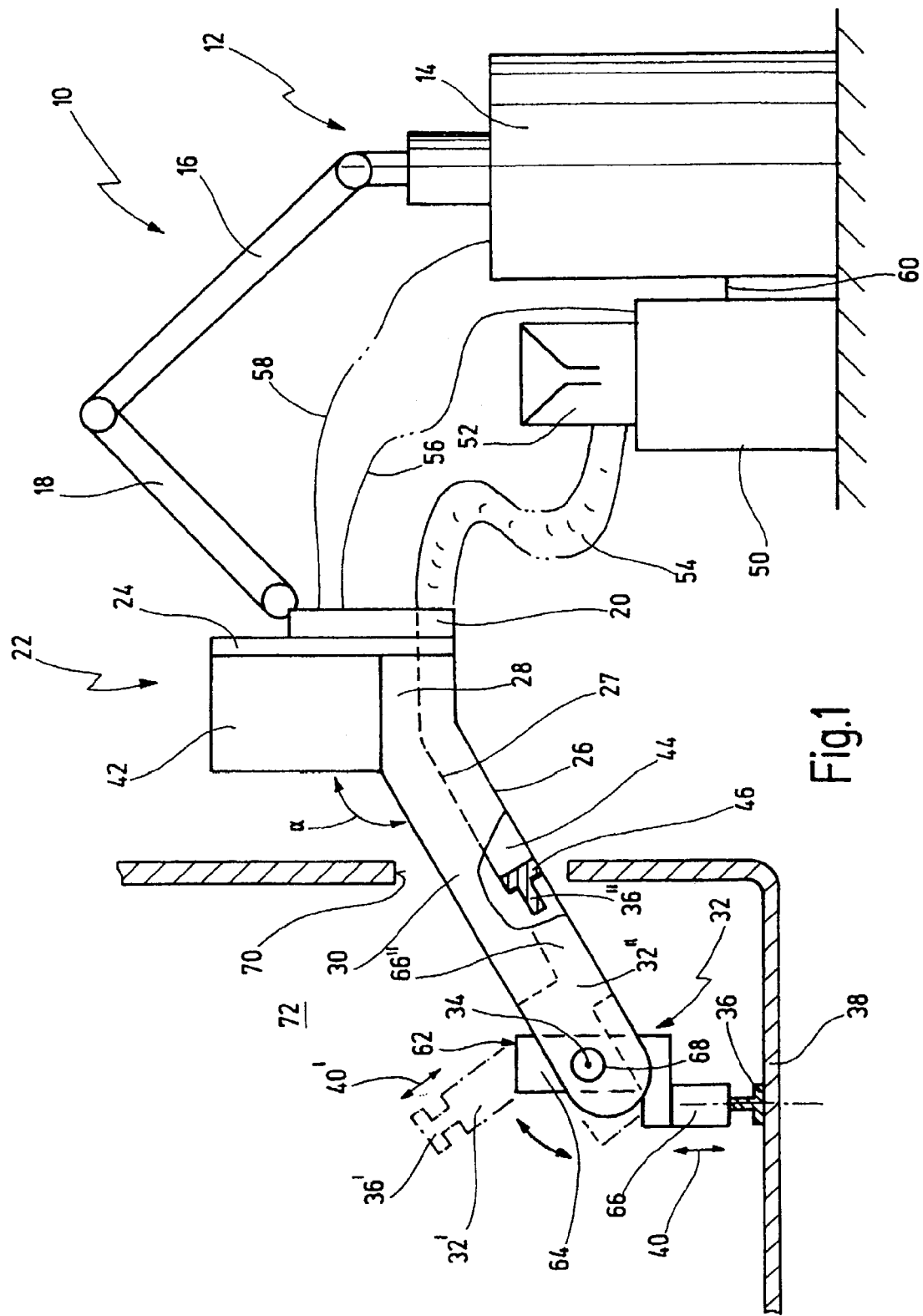
FIG. 1 shows a schematic view of a joining system according to the invention.

In FIG. 1, a joining system according to the invention is generally designated 10. The joining system 10 comprises a robot 12. The robot 12 contains a stationary base 14 from which two arms 16, 18 extend, articulately connected to each other. At the end of the arm 18, a flange 20 is provided.

To the flange 20, a joining system head is attached, generally designated 22 in FIG. 1. The joining system head 22 comprises a baseplate 24 attached to the flange. From the baseplate 24, an elongated carrier 26 extends. The elongated carrier 26 comprises a first short carrying segment 28 and an adjoining second elongated carrying segment 30. The second carrying segment 30 is bent off from the first carrying segment 28 by an angle α of 120°. The angle α is preferably between 60° and 80° or between 100° and 120°. In general, however, it is also conceivable that the first carrying segment 8 and the second carrying segment 30 may be oriented on an axis with each other. The axis of the second carrying segment 30 is designated 27 in FIG. 1.

At the end of the second carrying segment 30, a joining tool 32 is mounted rotatable about an axis 34. The axis of rotation 34 extends perpendicular to the axis 27 of the second carrying segment 30 and, in the embodiment shown, is oriented about parallel to the baseplate 24.

The joining tool 32 serves to weld an element, in particular a welding bolt 36, to a part, in particular a metal sheet 38. Although the joining system may be employed for numerous kinds of joining as a matter of design, a conformation of the joining system as a bolt-welding system, or short-time arc-welding system with lift ignition, is especially preferred. In the following, therefore, without loss of generality, the joining system will be referred to as a bolt welding system and the joining system head 22 as a bolt welding head. The joining tool 32 will be referred to as a welding tool 32. The welding tool 32 welds the bolts 36 to the part 38 in a linear motion (joining direction 40).

The welding head 22 further comprises a control means 42. The control means 42 is provided at the initial portion of the elongated carrier 26 and, in the embodiment shown, is mounted on the first carrying segment 28, to wit next to the baseplate 24. The control means 42 serves to drive the joining tool 32 and as intersection with superordinate control devices.

The welding head 22 further comprises a feeding means 44. The feeding means 44 serves to pick up bolts by the shank in advance from a feed hose and place them in readiness at a transfer station 46. The feed means 44 is consequently configured essentially as a tube or hose and extends along the elongated carrier 26. The transfer station 46 is located in a mid-portion of the second carrying segment 30. In it, one element at a time is placed in readiness for transfer to the welding tool 32. This element is designated 36" in FIG. 1.

The welding system 10 further comprises a stationary base station 50. The base station 50 serves to furnish energy for welding to the welding head 22 and serves as superordinate control device. The base station 50 is connected to an individualizing device 52. The individualizing device 52 serves to individualize bolts, as a rule supplied in bulk, and convey them to the feeding means 44 individually by way of a hose 54. For this purpose, the individualizing device 52 as a rule comprises a compressed air unit to convey the elements 36 pneumatically.

Further, FIG. 1 shows a line 56 connecting the base station 50 to the welding head 22. The line 56 is generally embodied as a system of lines, and includes lines to carry the welding current, control lines etc. Further, FIG. 1 shows a line 58 connecting the welding head 22 to the base 14 of the robot 12. The line 58 is optionally provided and contains one or more control lines. By means of the control lines 58, the motions of the robot 12 can be matched with those of the welding tool 32.

Alternatively or additionally, the base 14 of the robot 12 is connected to the base station 50 by way of a line 60. Hence it is possible also for the matching to take place between robot 12 and welding head 22 by way of lines 60, 56. The lines 56, 58 are passed to the control means 42, whence some are looped to the welding tool 32 (for energy supply to unit there), others are utilized directly.

The welding tool 32 comprises a housing 62 rotatably mounted on the axis 34. At the housing 62, a joining drive means 64 is provided in the form of a linear motor 64. The linear motor 64 serves to move a holding means 66 projecting from the housing 62 perpendicular to the axis of rotation 34 for holding one bolt 36 at a time. The linear motor 64 therefore constitutes a lifting means for executing lift and dip motions in the course of a bolt welding operation, as described in the introduction.

Further, at the end portion of the second carrying segment 30, a rotary drive 68 is provided, serving to rotate the welding tool 32 under control into any angular positions in relation to the second carrying segment 30. The rotational range is typically at least 270°, commonly 360°. The rotary drive 68 serves firstly to rotate the welding tool 32 into a suitable welding position in each instance, one of which welding positions is shown in solid lines in FIG. 1. An alternative welding position is indicated by dot-dash lines at 32'. In the further welding position, the welding tool 32' is employed along a welding direction 40' to weld a bolt 36' to a part not explicitly shown.

Further, the rotary drive 68 serves as loading drive means. For this purpose, the welding tool 32 is turned into a position shown dotted in FIG. 1. In this position, the holding means 66" is oriented flush with the transfer station 46, and is able in that position to grasp a bolt 36" there held in readiness and take it over for a subsequent welding operation.

Although, in the embodiment represented, the loading drive means is constituted by the rotary drive 68 alone, for example an electric motor, modifications of this are conceivable. Thus the loading drive means may for example be constituted in that the—non-rotatable—welding tool 32 is shifted in lengthwise direction on the carrier 26, to mention one example. It will be understood that then the transfer station 46 would have to be arranged correspondingly in a different place.

It is easily seen that the welding tool 32 may be configured with very small dimensions. In the first place, the welding tool 32 is spatially separated from the control means 42. In the second place, the welding tool 32 is decoupled from the pneumatic bolt-feeding means. So no pneumatic or hydraulic lines need be flanged to the welding tool 32. The supply of electricity to the linear motor 64 and/or the rotary drive 68 is comparatively easy to arrange. The same applies to the actuation of the holding means 66, insofar as it is actively actuated electrically.

Since the bolts 36 are put into the holding means 66, not from behind but from in front, no loading pin is required as in the prior art. Therefore the welding tool 32 can be compact in axial direction. It will be understood that instead of a linear motor as joining drive means 64, alternatively a combination of a spring and a solenoid may be provided. Further, it will be understood that the rotary drive 68 may be configured as an electric step motor having a precision of <1°, better yet 0.5°.

The parameters assigned to the rotary motion relate firstly to a welding program and secondly to a program of robot motion. Each welding position has its own welding program and its own robot motion program. By referring the parametric data to the several welding and robot motion programs, it is ensured that firstly the bolt 36 will always be perpendicular to the surface of the part 38, and secondly the welding tool 32 will be in a position in the robot motion affording the robot maximal freedom of motion on the way to the welding position. The control of the rotary motion of the welding tool 32 may be effected by way of the base station 50 and/or by way of the base 14 of the robot 12.

The oblique angling of the second carrying segment 30 with respect to the first carrying segment 28 offers, firstly, an improved interference edge clearance. Secondly, the feeding means 44 is easier to construct, since the bolts, as shown, are held at the transfer station 46 by gravity and/or blown air.

FIG. 1 further shows that the part 38 has the conformation of an angle part having a relatively small aperture 70. Viewed from the robot 12, the desired welding position is located inside of a cavity 72. It is easily seen that the bolt welding system 10 according to the invention is quite especially well-suited to accomplish this object. To introduce the second carrying segment 30 through the opening 70, the welding tool 32 can be turned into a position in which it is largely flush with the second carrying segment 30, for example the position 32" in FIG. 1.

After introduction into the cavity 72, the welding tool 32 is turned into the welding position indicated by solid lines. Before that, a bolt 36 is picked up from the transfer station 46, so that it is located in the holding means 66. Then, in per se conventional manner, a bolt welding operation is carried out, as explained in the introduction.

As remains to be set forth in detail below, the holding means 66 is preferably of such configuration that it can release the welded-on bolt 36 in a direction transverse to the welding direction 40. Consequently, it is possible to turn the joining tool 32 immediately after welding back into the flush position 32", with no need for the second carrying segment 30 to execute a motion in the welding direction 40. As soon as the flush position 32" has been reached, the second carrying segment 30 can be withdrawn again through the opening 70. The robot 12 then carries the welding head 22 to the next welding position. The axis of rotation 34 constitutes an additional axis of rotation for the robot 12. Hence the positioning in a welding position can be accomplished in simpler manner. This the more so as the additional axis of rotation is located near the welding position.

Another advantage of the welding system 10 according to the invention results as follows. In the prior art, the welding head as a whole was interference-edge relevant. In the prior art, therefore, no pneumatic valves were provided on the welding head. But this occasioned very complicated cabling between the base station 50 and the welding head 22.

Owing to the spatial separation of the control means 42 from the welding tool 32 at the welding head 22, the control means 42 itself is not interference-edge relevant. Consequently valves can be integrated into the control means 42 at the welding head 22, so that the number and complexity of the supply lines can be reduced. Since the control means 42 is provided at the welding head 22, no great outlay of electric cabling is needed between welding head 22 and base station 50. For example, it is possible for the supply lines 56 in a hose pack to contain only a welding cable, two auxiliary voltage supplies for the linear motor and a 24-volt supply for the control means, two light guides for serial transmission of measurement and control data and the feed hose 54. In an enlarged version, the hose pack might be supplemented by a protective gas supply line and/or a jet-suction line, for example for color marking. Hence the hose pack can be lighter in weight, torsionally less rigid and therefore more secure.

Besides, the uncoupling of supply means 44 and welding tool 32 makes it possible for the bolts 36 to be fed to the transfer station 46 parallel with the bolt welding operation. In the prior art, bolt feeding and bolt welding are strictly serial. Therefore cycle periods of <1 second are attainable only with great difficulty and under special boundary conditions.

According to the invention, immediately after removal of a bolt from the transfer station 46 to initiate a bolt welding operation, another bolt can be conveyed from the individualizing device 52 by way of hose 54 and feed means 44, to the transfer station 46. This can be accomplished while the welding tool 32 is performing a bolt welding operation.

Also, as the carrier 26 moves from one welding position to the next, the welding tool 32 can be swung to the transfer station 46 and then swung into the right setting for the new welding position. This parallelism also generally ensures that welding cycle periods of definitely less than 1 second are attainable. Although the elements to be welded may basically be of any shape, yet elements feedable by means of compressed air, in particular rotationally symmetrical elements, are especially suitable for processing by the joining system according to the invention. The further welding position 32' may for example be an overhead position, like the position 32' shown. This can be attained without need to rotate the carrier 26. This avoids overstraining the supply cable and hoses.

In the following description and details and modifications of the joining system shown in FIG. 1, like or similar elements are designated by the same reference numerals. Identical designation generally implies like or similar mode of operation, unless expressly otherwise noted below. Where individual elements of the joining system are discussed, it may be assumed that the function is otherwise identical or similar to the function of the joining system 10 of FIG. 1. Further, it will be understood that subsequent references to welding systems, heads or tools are intended to refer generally to such elements for joining, including for example riveting or bonding processes.

Figure 2:
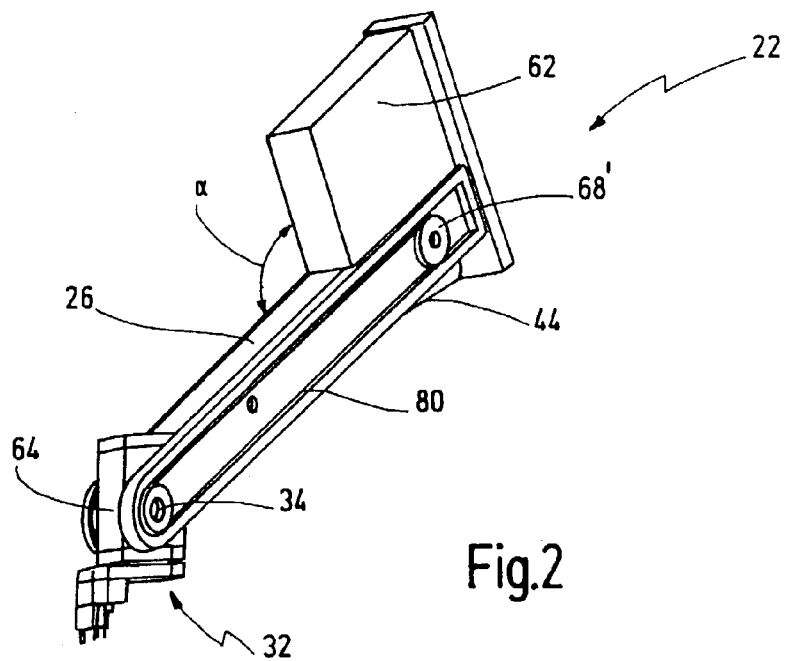
FIG. 2 shows an alternative conformation of a joining system according to the invention.

FIG. 2 shows an alternative embodiment of a welding head 22. In contradistinction to the welding head 22 of FIG. 1, a rotary drive 68' is provided to rotate the welding tool 32, not in the end portion of the second carrying segment 30, but in the region of the control means 42. The rotary motions of the rotary drive 68' are transmitted to the welding tool 32 by means of a belt drive 80. The belt drive 80 runs along the elongated carrier 26. The elongated carrier 26 is formed in the representation of FIG. 2 by two parallel arms, between whose end portions the welding tool 32 is rotatably mounted.

Figure 3:
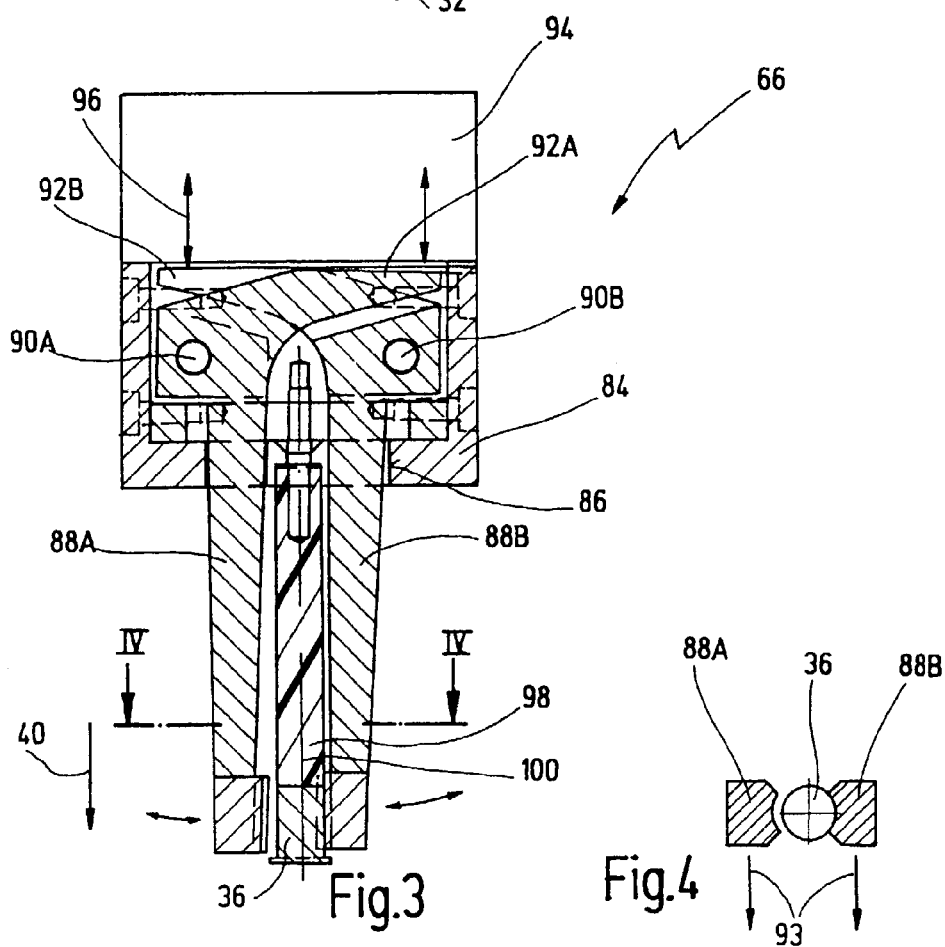
FIG. 3 shows a longitudinal section of an embodiment of a holding means.
Figure 4:
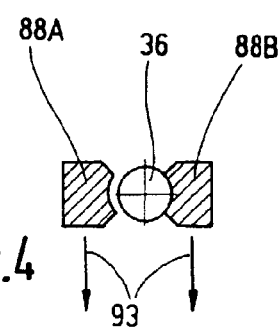
FIG. 4 shows a cross-section at the line IV—IV in FIG. 3.

FIGS. 3 and 4 represent an embodiment of a holding means 66. The holding means 66 comprises a housing 84, in turn comprising an opening 86 facing downward in the joining direction. The holding means 66 comprises two jaws 88A, 88B mounted with limited swingability on the housing 84 and made of an essentially inelastic material. The jaws 88A, 88B form a tongs, an element 36 being grasped between the ends of the jaws 88A, 88B with a predetermined force.

The jaws 88A, 88B are each connected in one piece with a lever segment 92A, 92B. With respect to axes 90A, 90B on which the jaws 88A, 88B are mounted, the lever segments 92A, 92B extend in the respective other direction. The lever segments 92A, 92B are here bent off relative to the joining direction 40, so that they overlap. By pressure on the lever segments 92A, 92B from above (in the representation of FIG. 3), the jaws 88A, 88B are consequently moved away from each other, releasing the bolt 36. This is shown for the jaw 88A in FIG. 3. It may be seen that the jaw 88A releases the bolt 36 completely in the direction transverse to the joining direction 40 (that is, in FIG. 3, out of the plane of the paper). Consequently the holding means 66 with opened jaws 88A, 88B can be moved transverse to the joining direction 40 and perpendicular to the plane of the jaws 88A, 88B without touching the bolt 36. The direction of motion of the jaws 88A, 88B in this operation is designated 93 in FIG. 4.

To actuate the lever segments 92A, 92B, an actuator 94 is provided, preferably triggered electrically. The actuator 94 opens and closes the jaws 88A, 88B actively in each instance. It will be understood that for this purpose the actuator 94 must be configured as a two-directional drive.

Active actuation of the jaws 88A, 88B has the advantage that the bolt 36 can be held with a defined force (for example 20 newtons). The derivation of the holding force from the elasticity of the several fingers of the tongs, as in the prior art, is dispensed with. Consequently a definitely longer service life can be attained. The direction of actuation of the actuator 94 is shown at 96 in FIG. 3. At their ends, the jaws 88A, 88B are of such conformation that they can securely grasp the bolt 36 in question. For this purpose, it may be appropriate to place suitable adapters on the jaws 88A, 88B, in order to fit different bolts 36.

From the under side of the housing 94, as shown in FIG. 3, a positioning pin 98 extends. The positioning or contact pin 98 is rigidly connected to the housing 84. It serves, when a bolt 36 is picked up from the transfer station 46, to ensure that the bolt 36 will occupy a defined position in relation to the holding means 66, and as a stop to assume the axial forces in welding.

The two-directional active actuator can consist of a pneumatic or hydraulic drive. Preferably, however, it consists of a combination of two electromagnets, or of an unregulated linear motor on the 'moving coil' or 'moving permanent magnet' principle. Further, it is possible to configure the actuator 94 as semi-active. Then the opening of the jaws 88A, 88B is effected for example by an electromagnet. When this is switched on, suitably arranged springs serve to ensure that a bolt 36 will be grasped by the jaws 88A, 88B with a defined force.

For welding, the jaws 88A and/or 88B are supplied with welding current, conducted to the bolt 36. The defined force provides for a secure, low-wear passage of current. For this reason, it will be understood that the jaws 88A, 88B will be made of a conductive metal. The positioning pin 98, however, should be nonconductive, or insulated from the housing 84.

Alternatively to an active or semi-active holding means 66, it is possible also to provide jaws of elastic configuration, permitting a lateral introduction of the bolt 36 between them (in the direction 93) and releasing them without substantial exertion of force upon motion transverse to a welded-on bolt 36. In FIG. 3, the longitudinal axis of the holding means 66 is designated 100.

Figure 5:
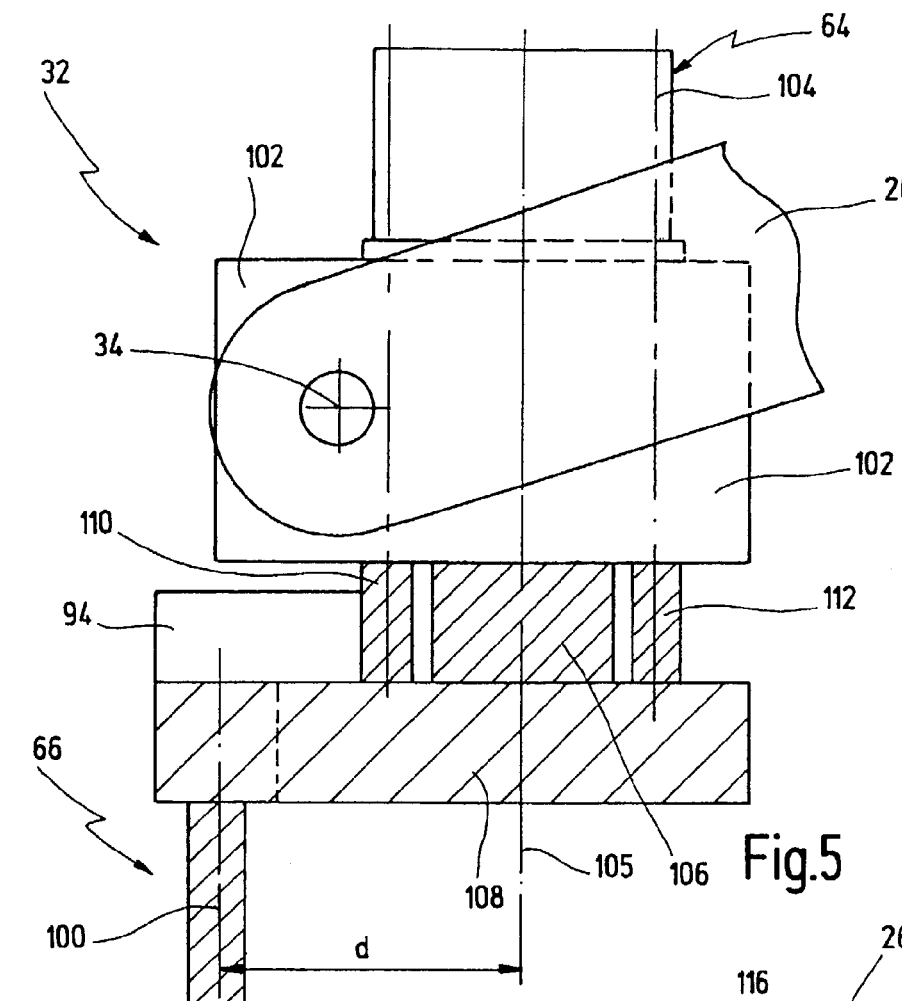
FIG. 5 shows the end portion of a joining system head according to the invention, with an alternative conformation of a joining tool.
Figure 6:
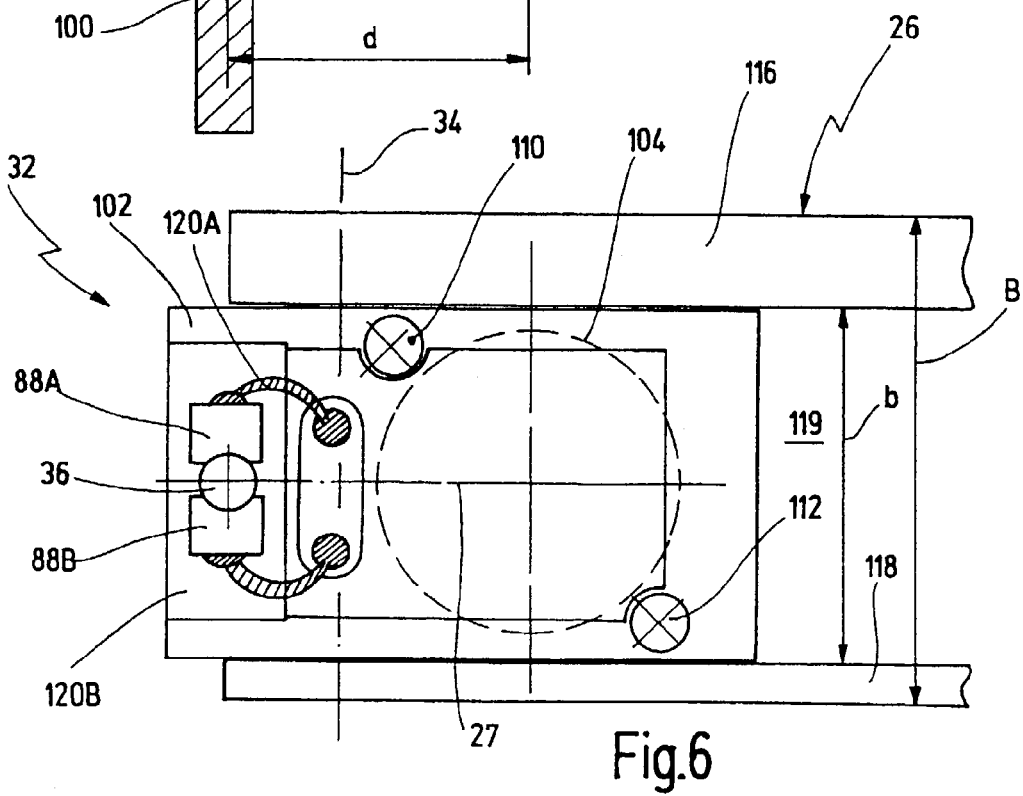
FIG. 6 shows a view of the end portion of the joining system head of FIG. 5 from below.

In FIGS. 5 and 6, an additional alternative embodiment of a welding tool 32 is shown. The welding tool 32 comprises a tool housing 102 to which a linear motor 104 of a joining drive means 64 is fixed. The axis or centerline of the linear motor 104 is shown at 105. It is represented that the axis 100 of the holding means 66 and the axis 105 of the linear motor 104 are spaced at a distance d from each other. In this way the holding means 66 is shifted out of the projection of the linear motor 104 in joining direction. This makes it possible to position the holding means 66, and therefore a held bolt 36, closer to an interfering wall or edge. Upon the whole, this enhances the flexibility of the welding head 22.

The linear motor 104 comprises an armature segment 106 connected to a guide plate 108 extending transverse to the joining direction. From the guide plate 108, two guide rods 110, 112 extend, arranged diagonally in relation to the linear motor 104. The guide rods 110, 112 ensure that the guide plate 108 is guided free from tilt. From the under side of the guide plate 108, the holding means 66 extends. An actuator to actuate the hold means 66 may for example be configured on top of the guide plate 108 or integrated therein.

In FIG. 6, it is shown that the carrier 26 is made up of a comparatively massive carrying arm 116 and a less massive tension arm 118 extending parallel thereto. The welding tool 32 is mounted between the arms 116, 118 along the axis of rotation 34. In FIG. 6, current cables 120 to supply current to the jaws 88A, 88B are also indicated.

Figure 7:
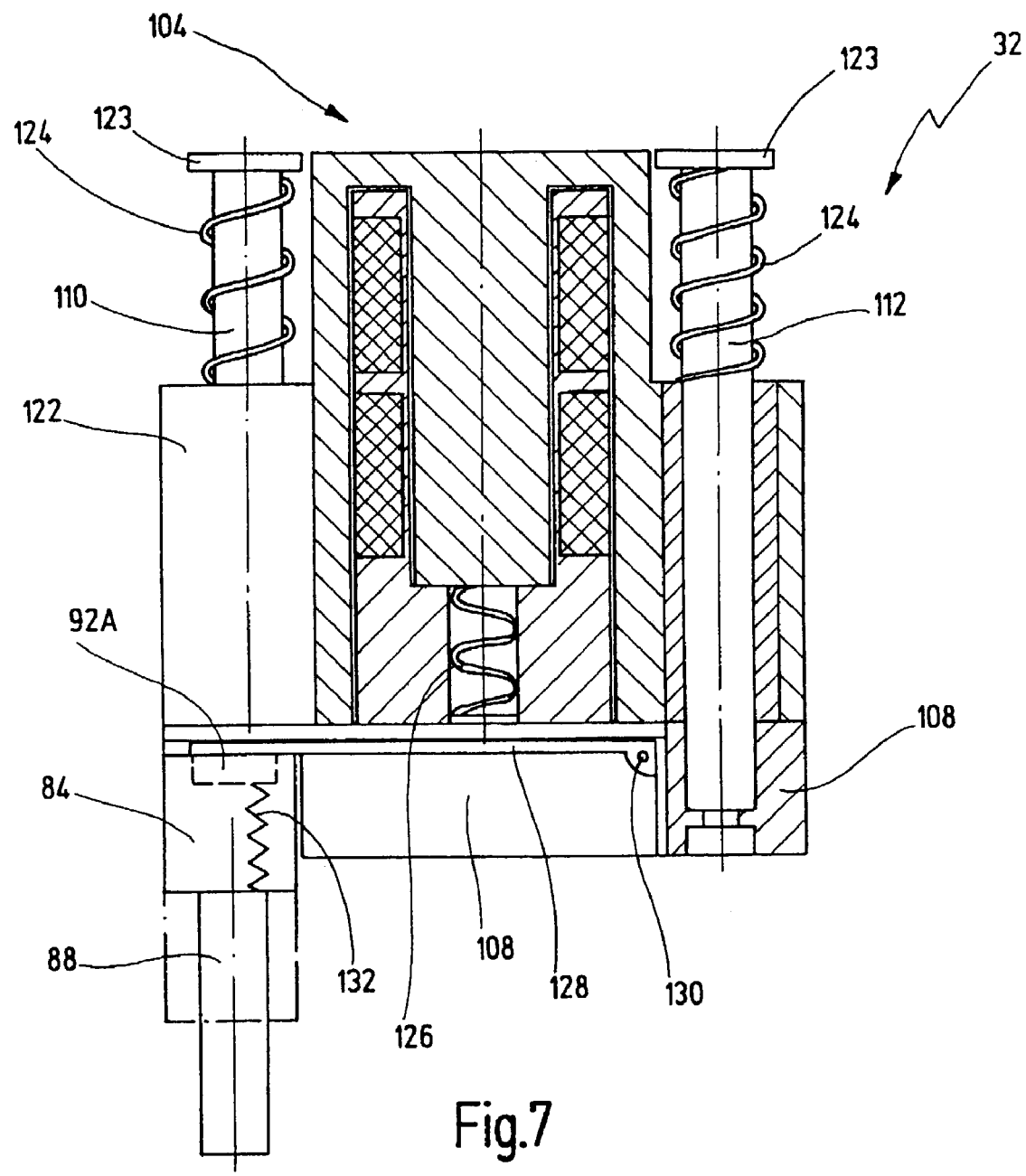
FIG. 7 shows another alternative embodiment of a joining tool of a joining system head according to the invention.

Another alternative conformation of a joining tool 32 is shown in FIG. 7. The welding tool 32 comprises a linear motor housing 122. At the tops of the guide rods 110, 112, flanges 123 are provided in each instance. Between the flanges 123 and the linear motor housing 122, compression springs 124 are arranged, configured around the guide rods 110, 112. The linear motor 104 is consequently so prestressed by the compression springs 124 that the guide plate 108 moved thereby is located in the retracted, to wit not extended, position. In addition to the compression springs 124 or alternatively thereto, an additional compression spring 126 may be provided inside of the linear motor housing 122.

Further, it is shown that on top of the guide plate 108, a hinged magnet 128 is articulated to an axis 130. The magnet 128 serves to press the lever segments 92A, 92B downward to open the jaws 88. In general, however, the lever segments 92 are pre-stressed towards the closed position of the jaws 88 by means of a tension spring 132.

Figure 8:
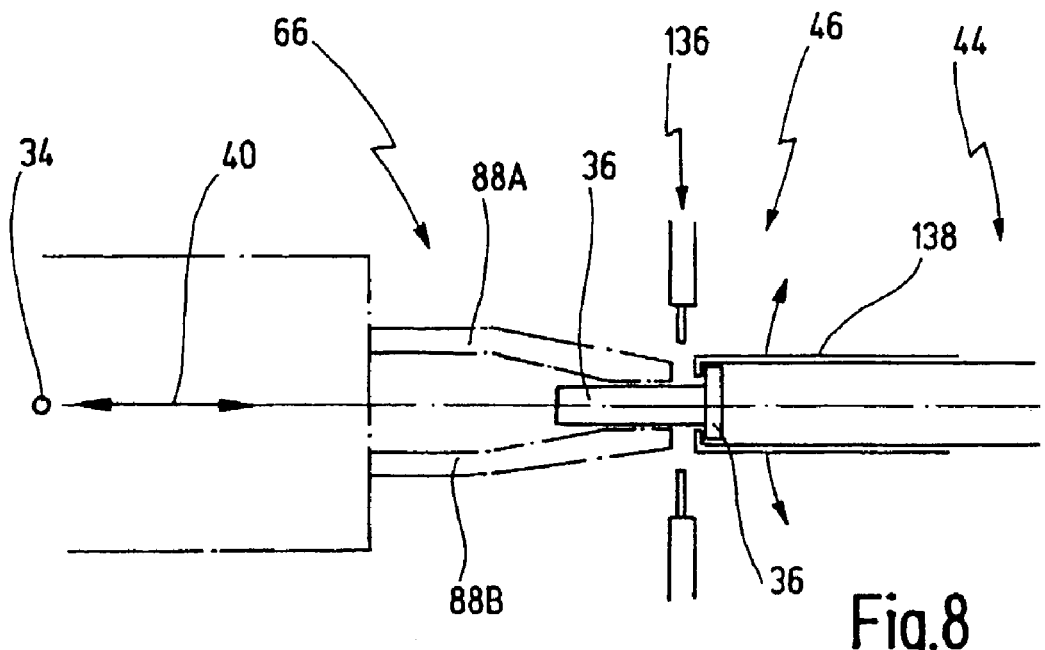
FIG. 8 shows a schematic representation of a transfer station of a joining system head according to the invention.

FIG. 8 shows a first embodiment of a transfer station 46 of the feeding means 44. At the transfer station 46, two opposed sensors 136 (for example a light barrier) are provided, detecting whether there is a bolt 36 in the transfer station 46 or not.

The feeding means 44 consists essentially of a tube or hose 138, bent off inward in the region of the transfer station 46. The bolts 36 are fed shank first from the individualizing device 52 through the feeding means 44. Consequently the head of the bolt 36 will strike the rolled edge of the tube 138 and remain so in the transfer station 46. Thus the shank of the bolt 36 protrudes from the tube 138.

The holding means 66 can now be run with opened jaws 88A, 88B all the way to the bolt 36 and grasp it. Then the holding means 66 is swung back again, out of the plane of the paper in the representation of FIG. 8. It will be understood that at the transfer station 46, a suitable lateral recess must be provided in the tube 138, though not explicitly shown in FIG. 8.

Figure 9:
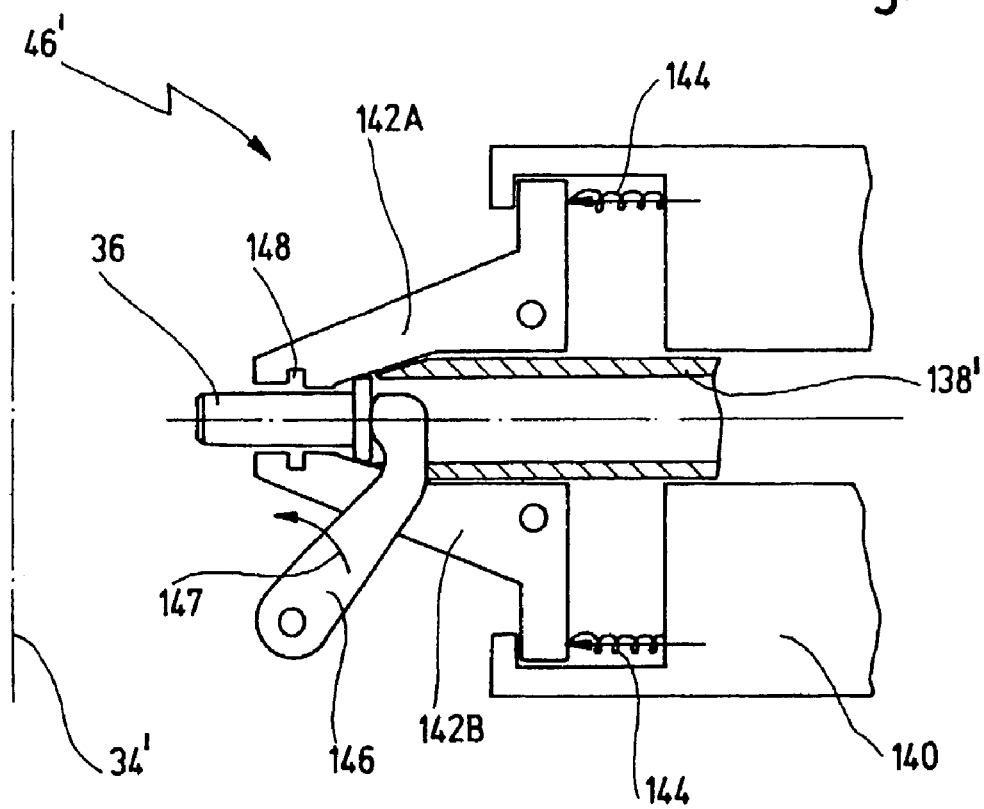
FIG. 9 shows a schematic representation of an alternative transfer station of a joining system head according to the invention.

An alternative embodiment of a transfer station 46' is shown in FIG. 9. In this embodiment a tube 138' of the feeding means 44' is open towards the end. At a transfer housing 140, two clamping jaws 142 are rotatably mounted. The jaws 142 are pre-stressed by means of two springs 144 into a position where their inner sides block the exit of a bolt 36 from the tube 138'. The bolt 36 is braked thereby upon being fed. Here a positioning lever 146 is swung laterally out of the representation shown in FIG. 9 to let the bolt 36 through. Then the positioning lever 146 is swung, as indicated at 147. Thus the bolt 36 presses the jaws 142A, 142B apart and is shifted away from the tube 138' until the head of the bolt 36 snaps into an annular recess 148. The annular recess 148 is formed by the inner sides of the jaws 142A, 142B. In this position, the bolt 36 is definitely held with a certain force. The holding means 66 may, as in FIG. 8, grasp the shank of the bolt 36 and pull it laterally out of the annular recess 148.

Over the embodiment of FIG. 8, this embodiment has the advantage that the bolt 36 is in a defined position in the transfer position 46', and is held with a defined force, so that a secure hold on the bolt 36 by the holding means 66 is ensured. It will be understood that at the transfer station 46' also, suitable sensors may be provided to detect a bolt 36 in the transfer position.

Figure 10:
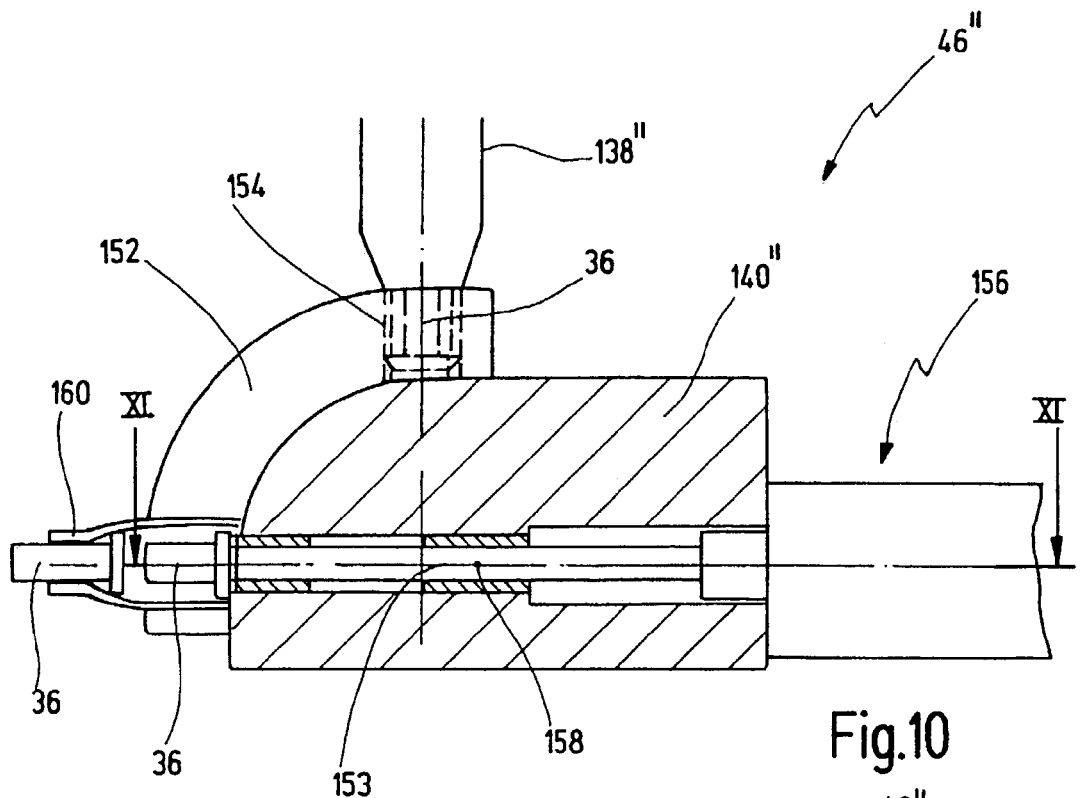
FIG. 10 shows a schematic representation of still another alternative embodiment of a transfer station of a joining system head according to the invention.
Figure 11:
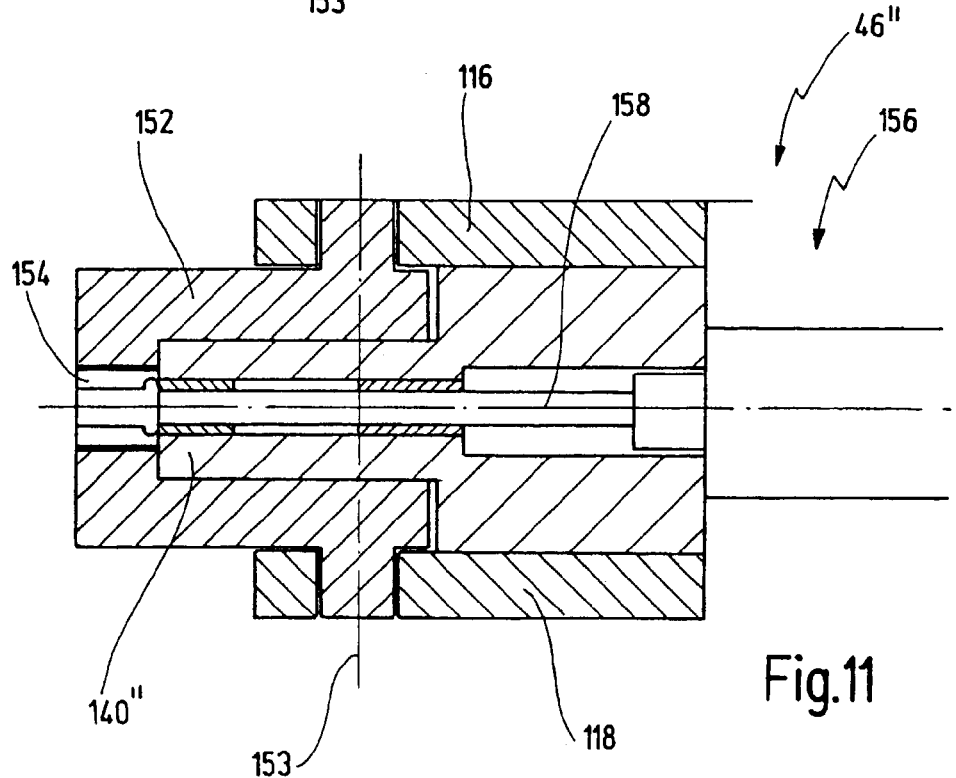
FIG. 11 shows a schematic sectional view at the line XI—XI in FIG. 10.

A third embodiment of a transfer station 46" is shown in FIGS. 10 and 11. In this embodiment, the bolts 36 are conveyed by way of a tube 138" into a bolt receptacle 154 of a swingable rotational segment 152. The segment 152 is rotatable about an axis 153 oriented transverse to the axis of the tube 138" and transverse to the orientation of the bolt 36 in the transfer position.

In FIGS. 10 and 11, the segment 152 is in a transfer position. In this position, a pneumatic cylinder 156 serves to push the bolt 36 by means of a plunger 158 between two tension jaws 160, between which the bolt 36 is then hold in a defined manner. Then the segment 152 is turned back to pick up another bolt 36 in the receiving position shown dotted, flush with the tube 138". This embodiment has the advantage that the bolts 36 can be conveyed at high speed through the tube 138". Hence short cycle periods can be achieved.

Figure 12:
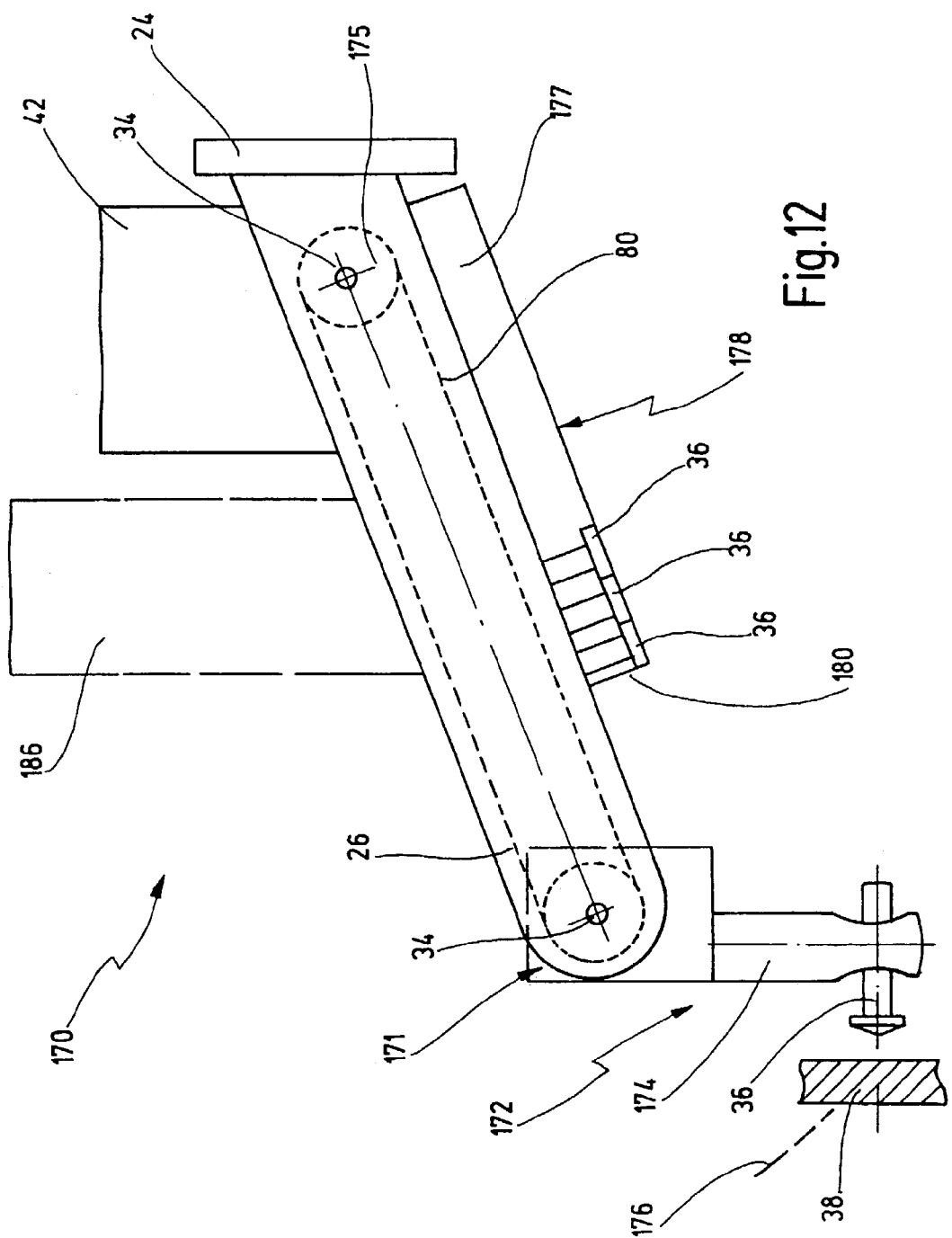
FIG. 12 shows a schematic side view of an alternative embodiment of a joining system head according to the invention.

Another embodiment of a welding head according to the invention is generally designated 170 in FIG. 12. The welding head 170 comprises, at the anterior end of the carrier 26, a welding tool 171 comprising only a housing rotatably mounted on the carrier 26 and a holding means 172 fixed thereto. The welding tool 171 is not provided with a welding drive motor, in particular not a linear motor.

The holding means 172 comprises two jaws 174 between which a bolt 36 is so held that it is oriented tangential to a circumference around the axis of rotation 34. In other words, a joining operation does not occur along a rectilinear motion, but along a circular path. The corresponding direction of guidance is indicated in FIG. 12 as a partial circle 176.

In this embodiment, a rotary drive 175 serves as joining drive means, arranged in the region of the control means 42. Rotary motions of the drive 175 are transmitted by a belt drive 80 to the welding tool 171. It will be understood that the rotary drive 175 is preferably an electric precision step motor with which the difficult movements of the bolt 36 can be executed during a bolt welding operation. The rotary drive 175 thus serves simultaneously also as loading drive, being swung so as to pick up one new bolt 36 at a time from a transfer station 180 of a feeding means 178.

In the feeding means 178, the bolts 36 are not fed successively but side by side, in such manner that the holding means 172 can grasp the bolts 36 transverse to their own extent. It will be understood that the feeding means 178 may either comprise suitable means of converting the lengthwise motion out of the individualizing device 52 into the transverse orientation shown in FIG. 12, or alternatively it is possible to feed the bolts 36 out of the individualizing device 52 already in transverse position.

Further, in FIG. 12 schematically a magazine 186 provided on the carrier 26 is provided. The magazine 186 may serve as supply magazine for a plurality of bolts 36, then to be transferred by means of a suitable integrated individualizing device to the feeding means 178, or to the transfer station 180. It will be understood that such a magazine may also be employed in the embodiments of FIGS. 1 to 11 instead of a stationary individualizing device 52 or in addition thereto.

The invention claimed is:

1. A joining system comprising:
   a robot having a movable elongated member; and
   a joining head rotatably coupled to the member, the head being movable relative to the member about an axis of rotation;
   the joining head including a holder having at least two jaws adapted to temporarily retain an element to be joined;
   the holder being advanceable in a first workpiece approaching direction prior to a joining operation; and
   the holder being retractable in a second direction substantially transverse to the first direction after the joining operation, wherein a gap created between the jaws and the element operably permits movement of the holder in the second direction with the element passing through the gap.

2. The system of claim 1 wherein the first direction is linear.

3. The system of claim 2, wherein the second direction is free of linear movement.

4. The system of claim 1, further comprising a welding arc being created.

5. The system of claim 4, further comprising a metallic element held by the holder, the welding arc extending from the element.

6. The system of claim 1, wherein the holder comprises jaws that contact against a depositable element and are transversely expandable to release the element.

7. The system of claim 1, further comprising:
a workpiece having an opening;
the robot having a stationary base located on one side of the opening of the workpiece; and
the holder being insertable through the opening of the workpiece to join the element to the workpiece on an opposite side of the opening from the stationary base.

8. A joining system, comprising:
a robot having a movable elongated member;
a head rotatably connected to the member, the head being movable relative to the member about an axis of rotation;
a holder connected to the head and operable to hold an element to be joined to a part, the holder including at least two gripping arms; and
a joining driver operable to move the holder along a joining direction for joining the element to the part; the holder being retractable in a second direction substantially transverse to the joining direction after joining the element to the part, wherein a gap created between the gripping arms and the element operably permits movement of the holder in the second direction with the element passing through the gap.

9. The joining system according to claim 8, wherein the holder and the joining driver operably form part of a joining tool which is rotatable about the axis of rotation.

10. The joining system according to claim 9, further comprising a projecting elongated carrier, wherein the joining tool is rotatable about the axis of rotation at an end portion of the projecting elongated carrier.

11. A joining system, comprising:
a robot having a movable elongated member;
a head connected to the member, the head being movable relative to the member;
a holder operable to hold an element to be joined to a part;
a joining driver operable to move the holder along a joining direction for joining the element to the part;
the holder being rotatably mounted on the head about an axis of rotation running substantially transverse to the joining direction;
the holder and the joining driver operably form part of a joining tool which is rotatable about the axis of rotation;
a projecting elongated carrier, wherein the joining tool is rotatable about the axis of rotation at an end portion of the projecting elongated carrier; and
two carrier arms running substantially parallel, the joining tool being rotatably mounted between the two carrier arms.

12. The joining system according to claim 10, wherein the axis of rotation is oriented transverse to a longitudinal axis of the carrier.

13. The joining system according to claim 8, further comprising:
a feeding device;
a transfer station; and
a loading drive element operable to rotate at least one of the holder and the joining driver along an entire path to the transfer station.

14. The joining system according to claim 13, further comprising an elongated carrier, the transfer station being fixed to the carrier.

15. The joining system according to claim 13, wherein the loading drive element comprises a rotary motor.

16. The joining system according to claim 15, wherein the loading drive element comprises a transmission operably transmitting motions of the rotary motor to the holder.

17. The joining system according to claim 16, wherein the transmission includes a tensioning element.

18. The joining system according to claim 13, wherein the loading drive element and the joining driver comprise a single rotary drive device.

19. The joining system according to claim 13, wherein the loading drive element comprises a linear drive device.

20. The joining system according to claim 19, wherein a longitudinal axis of the linear drive device and a longitudinal axis of the holder are spaced apart and parallel to each other.

21. The joining system according to claim 8, wherein the at least two gripping arms comprise a diametrically opposed pair of arms disposed with respect to a longitudinal axis of the holder and movable toward and away from each other to each of hold and release the element and operable to create the gap when moved away from each other.

22. The joining system according to claim 8, further comprising a jaw actuator active to move the gripping arms of the holder relative to each other.

23. The joining system according to claim 8, wherein the gripping arms comprise elastic material permitting the gripping arms to be passively movable with respect to each other.

24. The joining system according to claim 8, wherein the robot is movable on at least two coordinate axes.

25. The joining system according to claim 24, further comprising:
a feeding device; and
an individualizing device operable to convey individual ones of the elements to the feeding device.

26. A joining system, comprising:
a depositable element to be welded;
a set of jaws operable to hold the element during welding;
a robot movably supporting the set of jaws;
an advancing element of the robot operable to move the jaws in a substantially linear advancing direction to advance the element into a welding position; and
a release feature operable to move the jaws away from each other to release the element and create a gap between the jaws and the element, the jaws together movable in a retracted direction of the jaws away from the welding position, the retracted direction being substantially transverse to the advancing direction, the gap permitting the jaws to clear the element during motion in the retracted direction.

27. The system of claim 26, wherein the advancing element further comprises a linear driver operably moving the jaws in the advancing direction.

28. The system of claim 27, wherein the release feature further comprises a second driver operably moving the jaws in the retracted direction.

29. The system of claim 28, wherein the second driver is operable to rotate the jaws at least 270°.

30. The system of claim 27, wherein the linear driver is an electromagnetic actuator.

31. The system of claim 26, wherein the robot comprises an articulated robot having an elongated carrier, the jaws being movably coupled to the carrier.

32. The system of claim 31, further comprising a feeder operably feeding multiples of the element to the jaws.

33. The system of claim 26, further comprising an angled lever coupled to each jaw, the levers operably causing movement of the jaws relative to each other.

34. The system of claim 33, further comprising an automatic actuator operably moving the levers.

35. The system of claim 26, further comprising a welding current transferable from the jaws to the element for welding.

36. The system of claim 26, wherein the retracted direction is a rotational arc.

37. The system of claim 26, wherein the retracted direction is oblique to the advancing direction.

38. The system of claim 26, wherein the jaws are passively movable relative to each other.

39. The system of claim 26, wherein the element has an elongated, metallic and substantially cylindrical shaft.

* * * * *

UNITED STATES PATENT AND TRADEMARK OFFICE
CERTIFICATE OF CORRECTION

PATENT NO. : 7,060,930 B2  
APPLICATION NO. : 10/436882  
DATED : June 13, 2006  
INVENTOR(S) : Klaus G. Schmitt et al.

It is certified that error appears in the above-identified patent and that said Letters Patent is hereby corrected as shown below:

Title Page,  
Item [56] References Cited, U.S. PATENT DOCUMENTS, insert the following:

```
        --2,549,804      4/1951      Graham
          2,727,123     12/1955      Gregory, Jr.
          2,790,066      4/1957      Haynes et al
          3,495,066      2/1970      Broyard et al
          3,989,920     11/1976      Masubuchi et al
          4,306,137     12/1981      Shoup et al
          5,171,959     12/1992      Schmitt et al
          5,252,802     10/1993      Raycher
          5,317,123      5/1994      Ito
          5,317,124      5/1994      Lesser et al
          5,321,226      6/1994      Raycher
          5,349,152      9/1994      Renner
          5,502,291      3/1996      Cummings
          5,938,945      8/1999      Hoffman et al
          5,938,946      8/1999      Kurz
          5,977,506     11/1999      von Daniken
          5,981,896     11/1999      Keanini et al
          6,060,690      5/2000      Tyagi
          6,215,085      4/2001      Cummings et al
       2003/0141347      7/2001      Jurgen et al --.
```

Title Pgae,  
Item [56] References Cited, insert the following:  
--FOREIGN PATENT DOCUMENTS  
```
          WO     00/78495      12/2000
          DE     44 00 350      7/1995
          EP     0 715 924      6/1996
          GB     2 285 405      7/1995
          WO     01/6246        8/2001 --.
```

Title Page,  
Item [56] References Cited, insert the following:  
--OTHER PUBLICATIONS  
European Patent Office Search Report for 03010431, 4 pages, dated 9/2/2003.

Neue Tucker Technologie. Bolzenschweißen mit System!; dated September 1999 (Brocure in German with translation brochure attached).

UNITED STATES PATENT AND TRADEMARK OFFICE
CERTIFICATE OF CORRECTION

PATENT NO. : 7,060,930 B2
APPLICATION NO. : 10/436882
DATED : June 13, 2006
INVENTOR(S) : Klaus G. Schmitt et al.

It is certified that error appears in the above-identified patent and that said Letters Patent is hereby corrected as shown below:

Bolzenschweißen Grundlagen und Anwendung" by Trillmich, Welz, Fachbuchreihe Schweiteßchnik, DVS Verlag, 1997, Chapter 9.3. --.

Column 16,
Line 15, delete "each of".

Signed and Sealed this

Sixth Day of February, 2007

JON W. DUDAS
*Director of the United States Patent and Trademark Office*